(No Model.) 2 Sheets—Sheet 1.
N. C. BASSETT.
CAR BRAKE.
No. 494,751. Patented Apr. 4, 1893.
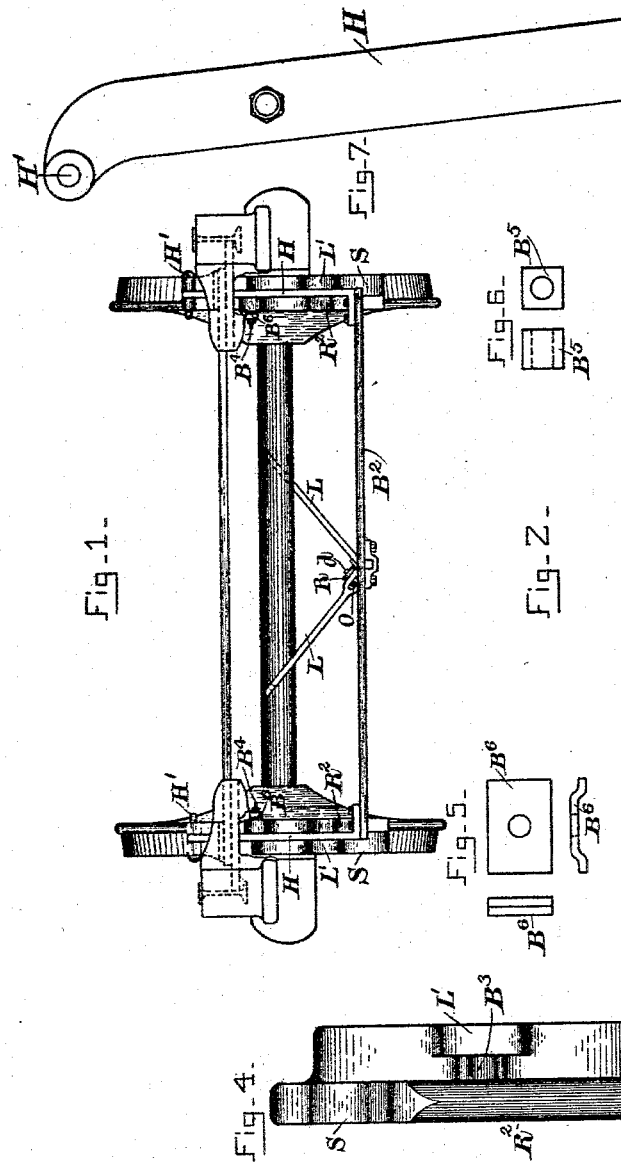
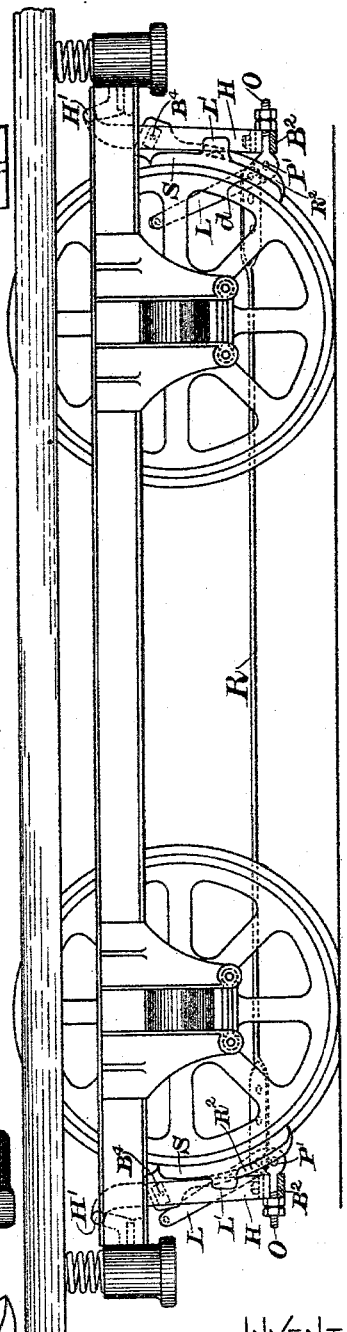
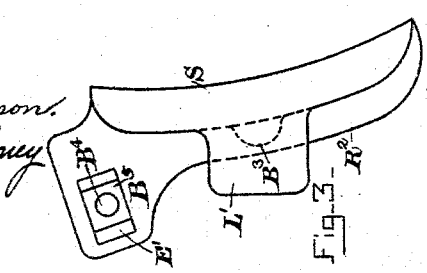

(No Model.) 2 Sheets—Sheet 2.
N. C. BASSETT.
CAR BRAKE.
No. 494,751. Patented Apr. 4, 1893.
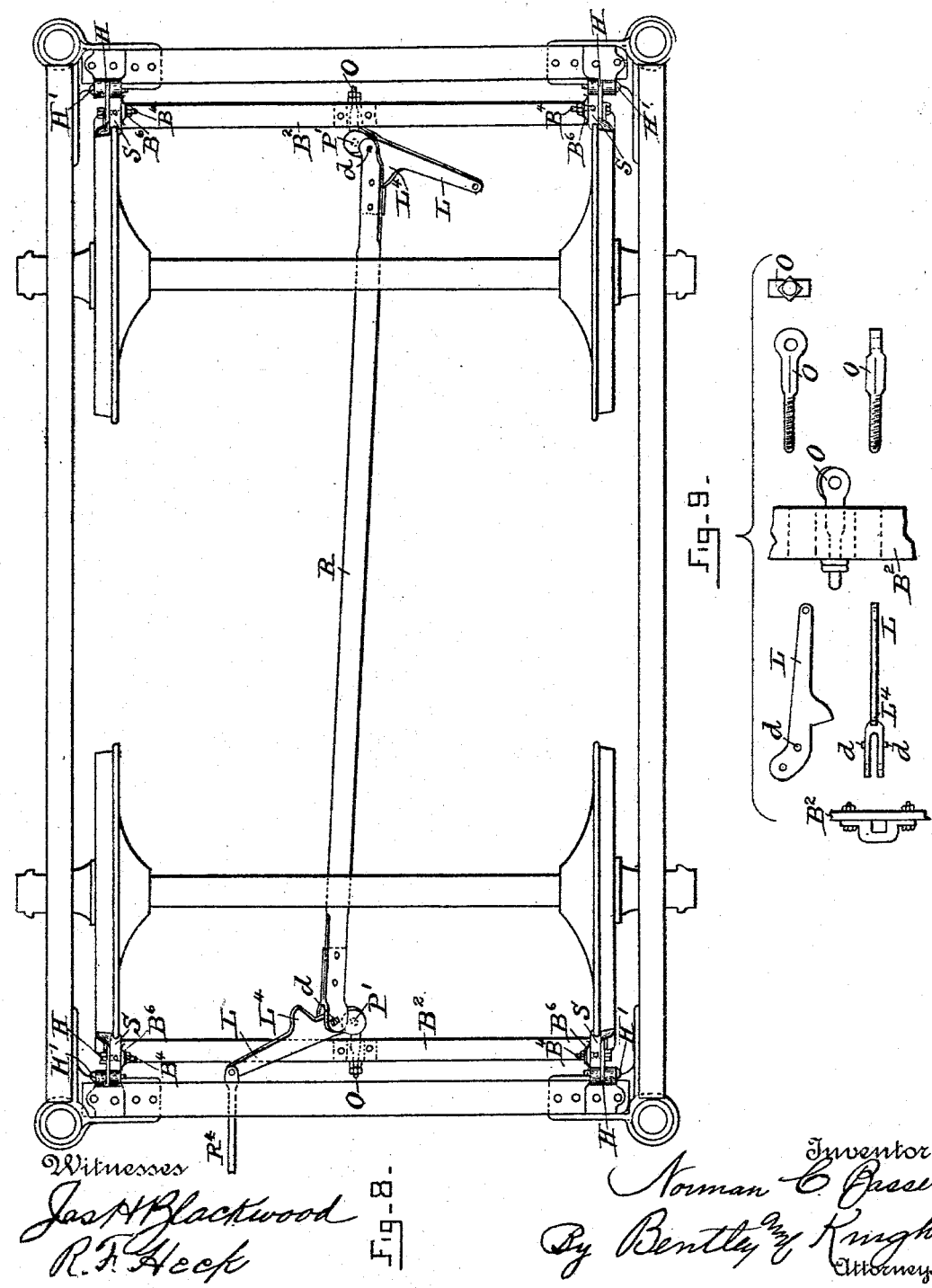

UNITED STATES PATENT OFFICE.

NORMAN C. BASSETT, OF LYNN, MASSACHUSETTS, ASSIGNOR TO THE THOMSON-HOUSTON ELECTRIC COMPANY, OF CONNECTICUT.

CAR-BRAKE.

SPECIFICATION forming part of Letters Patent No. 494,751, dated April 4, 1893.

Application filed January 7, 1891. Serial No. 377,059. (No model.)

*To all whom it may concern:*

Be it known that I, NORMAN C. BASSETT, a citizen of the United States, residing at Lynn, in the county of Essex and State of Massachusetts, have invented a certain new and useful Improvement in Brake Mechanism for Car-Trucks, of which the following is a specification.

In car trucks driven by electric motors journaled upon the axles according to the modern practice, there is difficulty in arranging the brake gear so as to avoid interference with the motors, the difficulty consisting chiefly in getting the pull rod or rods far enough down to pass underneath and clear of the motors.

My present invention comprises an arrangement in which the brake gear is attached, not to ordinary brake beams joining the shoes at their centers, but to a supplementary swinging frame which is given a bearing upon the shoes, and may be extended below them any desired distance. This enables the connecting rods or other gear used to be brought down low enough to pass clear of the motors, and avoid the difficulty mentioned above.

My invention also consists in certain novel means for hanging the brake shoes from the supplementary frame, and in a peculiar form of brake shoe, all as hereinafter specifically described.

In the accompanying drawings my improvements are illustrated wherein:

Figure 1 shows an end elevation of the truck with the brake mechanism attached. Fig. 2 shows a side elevation of the same. Figs. 3 and 4 show side and end elevations of the brake shoes. Figs. 5, 6, and 7 show in detail the spring washer, the sliding bearing block for the brake shoes, and one of the suspension bars of the brake frame, and Fig. 8 shows a plan view of the truck with brake mechanism attached, and Fig. 9 shows detail views of certain specific features.

The brake shoes S are hung so as to engage the car wheels at about the usual height. In previous constructions the brake gear has been connected with the shoes on a level with their centers, but to bring this lower down I connect it not with the ordinary brake beam joining the shoes directly, but to a supplementary frame consisting of upright suspension bars H, H, pivoted at their upper ends to the truck frame, and joined by a cross bar $B^2$ at their lower ends which may extend any desired or necessary distance below the brake shoes. The suspension bars are set edgewise to give rigidity to the frame, and their pivotal points $H'$ are back from the wheels a distance such that the weight of the shoes and frame tends to carry the shoes away from the wheel when the brake is released.

To the cross bars $B^2$ are attached any desired form of brake gear for swinging the frames toward the wheels, which results in applying the brakes, the gear herein shown consisting of brake levers L pivotally connected with cross bars $B^2$ by bolts O, and linked together by a pull rod R.

The brake shoes are hung from the suspension bars H by an adjustable bearing, permitting the shoes to adjust themselves closely to the wheels when pressure is applied, and consisting of a block $B^5$ bolted to the suspension bars by a bolt $B^4$, and allowed a limited sliding motion in an elongated opening $E'$ in the brake shoe. A stiff spring washer $B^6$ is placed under the nut on the bolt, and bears against the shoe so as to cause the bearing block to move in its opening with considerable friction. The shoe is provided with the usual groove partially surrounding the flange of the car wheel. At its center there is a rounded boss or bearing surface $B^3$, against which the suspension bar rests when pressure is applied to force the shoe against the wheels, and side lugs or ribs $L'$ and $R^2$ between which the suspension bar fits. This construction brings the pressure at the center of the shoe making it wear even, and holds the shoes in position sidewise so that the slight taper of the wheel tread cannot result in displacing them laterally. The upward and downward thrust is taken by the bolts $B^4$ which connect the shoes with the suspension bars H, and the spring washers $B^6$ hold them against the suspension bars with a spring pressure sufficiently great to prevent shifting in the slots by their own weight, while allowing the automatic adjustment of the shoes to the wheels under the pressure applied to the brake mechanism.

The brake levers L are provided with lugs L⁴ which alternately engage the connecting rod R to form a stop to the backward movement of the brake frame. A peculiar construction also is introduced in these levers L to bring the pivots P' and $d$, by which they are connected with the cross bars and connecting rod, closer together than in previous constructions and thereby giving a greater leverage to the brake windlass which is connected with a rod R⁴ attached to the outer ends of the brake levers. The lower end of each lever L is split, and has cast on the outside of each arm a pivot pin $d$ upon which is pivoted the connecting rod R similarly forked. The head of the pivot bolt O passes between the forks of L, and is joined thereto by a pin P' riveted and filed flush with the exterior surface of the fork, so that the rod R can swing down over this latter pivot pin without striking though the pins are brought close together.

What I claim as new, and desire to secure by Letters Patent, is—

1. The combination with a suspension bar pivoted to the truck frame, of the brake shoe attached thereto by a sliding bearing permitting adjustment of the shoe to the wheels, as set forth.

2. The combination of the swinging brake frame comprising the suspension bars joined by a cross bar, with the brake shoes, the sliding blocks forming adjustable bearings between the shoes and suspension bars, and the spring washers causing said blocks to move with considerable friction, as described.

3. The combination of the suspension bars with the brake shoes loosely suspended at their upper ends and having below said suspension point a rounded boss or bearing surface against which the suspension bars bear, and brake gear connected with the suspension bars a desired distance below their bearing upon the shoes.

4. A brake shoe having a rounded boss or bearing surface at its center, and side lugs, as described.

5. The combination with the brake apparatus of a car truck, of the brake levers L connected together by a rod R, and provided with lugs L⁴ serving as stops, for the purpose described.

6. The combination with the brake apparatus of a car truck, and the brake levers L having forked ends and pivot pins upon the outside faces of the forks, of a connecting rod R forked and pivoted upon said pins, and the bolts O connecting the levers with the brake apparatus, and pivoted to the levers within their forked ends by a pin flush with the outer surface of the forks.

In testimony whereof I have hereto set my hand this 1st day of January, 1891.

NORMAN C. BASSETT.

Witnesses:
JOHN W. GIBBONEY,
BENJAMIN B. HULL.